(12) United States Patent
Kato et al.

(10) Patent No.: US 7,776,937 B2
(45) Date of Patent: Aug. 17, 2010

(54) PHOTOCURABLE COMPOSITION FOR FORMING AN ANTI-FOGGING COATING

(75) Inventors: Atsuya Kato, Hiratsuka (JP); Yu Akaki, Yokohama (JP); Takeshi Matsuda, Yokohama (JP); Takashi Tanaka, Hiratsuka (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 457 days.

(21) Appl. No.: 11/660,375

(22) PCT Filed: Aug. 17, 2005

(86) PCT No.: PCT/JP2005/015303

§ 371 (c)(1),
(2), (4) Date: Feb. 16, 2007

(87) PCT Pub. No.: WO2006/019175

PCT Pub. Date: Feb. 23, 2006

(65) Prior Publication Data

US 2008/0118658 A1  May 22, 2008

(30) Foreign Application Priority Data

Aug. 19, 2004  (JP) .............................. 2004-239381
Sep. 7, 2004   (JP) .............................. 2004-259945

(51) Int. Cl.
*C09D 5/00* (2006.01)
*C09D 163/10* (2006.01)
*C09D 175/14* (2006.01)

(52) U.S. Cl. ........................ 522/92; 522/93; 526/328

(58) Field of Classification Search ............... 522/92, 522/93; 526/328
See application file for complete search history.

(56) References Cited

U.S. PATENT DOCUMENTS

| | | | | | |
|---|---|---|---|---|---|
| 4,054,683 A | * | 10/1977 | Gruber | ...................... | 427/514 |
| 4,745,003 A | * | 5/1988 | Sirkoch et al. | .............. | 427/514 |
| 5,273,812 A | * | 12/1993 | Oguchi et al. | .............. | 428/220 |
| 5,985,420 A | * | 11/1999 | Haga et al. | .................. | 428/212 |
| 7,105,206 B1 | | 9/2006 | Beck et al. | | |
| 2006/0115602 A1 | | 6/2006 | Beck et al. | | |

FOREIGN PATENT DOCUMENTS

| | | |
|---|---|---|
| JP | 64-51403 | 2/1989 |
| JP | 5-17740 | 1/1993 |
| JP | 11-140109 | 5/1999 |
| JP | 11-152356 | 6/1999 |
| JP | 2002-273325 | 9/2002 |
| JP | 2003-515445 | 5/2003 |
| JP | 2004-143303 | 5/2004 |
| JP | 2004-204095 | 7/2004 |

* cited by examiner

*Primary Examiner*—Susan W Berman
(74) *Attorney, Agent, or Firm*—Wenderoth, Lind & Ponack, L.L.P.

(57) ABSTRACT

The present invention discloses a photocurable composition for forming an anti-fogging coating, comprising: (A) a urethane compound containing at least two (meth)acryloyl groups and a polyoxyalkylene chain in a molecule thereof, (B) a compound having at least two (meth)acryloyl groups and at least two hydroxyl groups in a molecule thereof, obtained by reacting at least two components consisting of an epoxy compound and (meth)acrylic acid, (C) a compound having an ethylenic unsaturated group other than the components (A) and (B), and (D) a photopolymerization initiator, and also discloses a method for forming an anti-fogging coating using this composition.

14 Claims, No Drawings

PHOTOCURABLE COMPOSITION FOR FORMING AN ANTI-FOGGING COATING

TECHNICAL FIELD

The present invention relates to a photocurable composition for forming an anti-fogging coating, capable of imparting superior fogging prevention to the surface of a base material such as plastic, glass or metal for a long period of time, and capable of forming a coating having superior adhesion and surface curability, and also relates to a method for forming an anti-fogging coating using this composition.

BACKGROUND ART

Although plastic molded products made of polycarbonate resin or acrylic resin and so on are used in a wide range of applications due to their superior transparency and ease of processing, if the surface temperature thereof falls below the dew point temperature, moisture in the atmosphere forms fine water droplets that condense resulting in fogging, thereby resulting in the problem of a loss of transparency. Various studies were conducted in the past for imparting anti-fogging properties to the surface of molded products while also generating charge prevention by making the surface of these molded products hydrophilic.

Methods for forming an anti-fogging coating on the surface of a base material are known in the prior art, and various photocurable compositions for forming an anti-fogging coating consisting of forming a curable coating by irradiation with ultraviolet light and so on have been proposed in consideration of workability and other factors. For example, Japanese Patent Application Laid-open No. Hei 6 (1994)-136165 and Japanese Patent Application Laid-open No. 2001-19874 disclose an anti-fogging agent containing polyethylene glycol diacrylate, a surfactant and a photopolymerization initiator. In addition, Japanese Patent Application Laid-open No. Hei 11 (1999)-140109 discloses an anti-fogging composition containing a (meth)acrylate having at least two hydroxyl groups and at least two (meth)acryloyl groups in a molecule thereof, and a reactive surfactant. Moreover, Japanese Patent Application Laid-open No. 2003-12743 discloses an anti-fogging composition containing a (meth)acrylamide-based compound, a urethane polymer, polyalkylene glycol acrylate and a photopolymerization initiator.

On the other hand, compositions containing components photocured by radical polymerization in the manner of (meth)acryloyl group-containing compounds are susceptible to curing inhibition by oxygen present in the atmosphere in which the coating surface is irradiated in the case of forming a coating as a result of being cured by irradiation with ultraviolet or other light. In order to counteract this, methods have been proposed involving the use of a large amount of photopolymerization initiator, irradiating the coating with a high-output lamp, or as described in Japanese Unexamined International Patent Publication No. 2003-515445, irradiating the coating with light in the presence of an inert gas.

However, the compositions disclosed in the above-mentioned Patent Application Laid-open No. Hei 6 (1994)-136165, Japanese Patent Application Laid-open No. 2001-19874 and Japanese Patent Application Laid-open No. Hei 11 (1999)-140109 all have inferior adhesion to the surface of the base material. In addition, although the coating formed from the composition described in Japanese Patent Application Laid-open No. 2003-12743 offers a certain degree of sustained anti-fogging performance, when exposed to high-temperature conditions during use or high-humidity conditions due to rainfall for an extended period of time as in the manner of automobile headlights, there is the problem of decreases in anti-fogging performance and adhesion.

In addition, when coatings composed of the compositions described in the patent publications listed above are irradiated with light in an inert gas atmosphere, although resistance of the coating surface to friction improves to a certain extent, the problem of decreases in anti-fogging performance and adhesion remains unsolved.

DISCLOSURE OF THE INVENTION

A main object of the present invention is to provide a photocurable composition for forming an anti-fogging coating and a method for forming an anti-fogging coating capable of forming a coating having superior anti-fogging performance, adhesion, transparency, surface curability and scratch resistance, and capable of maintaining anti-fogging performance, adhesion and other properties without allowing any decreases thereof even if exposed for an extended period of time to high-temperature conditions during use and high-humidity conditions due to rainfall as in the manner of automobile headlights.

Other objects, characteristics and aspects of the present invention will be made clear from the following description.

The present invention provides a photocurable composition for forming an anti-fogging coating, comprising:

(A) a urethane compound containing at least two (meth)acryloyl groups and a polyoxyalkylene chain in a molecule thereof;

(B) a compound having at least two (meth)acryloyl groups and at least two hydroxyl groups in a molecule thereof, obtained by reacting at least two components consisting of an epoxy compound and (meth)acrylic acid;

(C) a compound having an ethylenic unsaturated group other than the components (A) and (B); and (D) a photopolymerization initiator.

In addition, the present invention provides a method for forming an anti-fogging coating comprising: applying the photocurable composition for forming an anti-fogging coating on the surface of a base material followed by irradiating with light.

According to the present invention, the remarkable effect is obtained by which an anti-fogging coating of long duration can be formed on the surface of a base material that has superior anti-fogging performance, adhesion, transparency, surface curability and scratch resistance, and is capable of maintaining that anti-fogging performance, adhesion and other properties without allowing any decreases thereof even if exposed to high-temperature and high-humidity conditions for an extended period of time.

The following provides a more detailed explanation of the present invention.

Urethane Compound (A):

The urethane compound (A) used in the composition of the present invention is a urethane compound containing at least two, and preferably two, (meth)acryloyl groups and a polyoxyalkylene chain in a molecule thereof.

Examples of the polyoxyalkylene chain include polyoxyethylene chains, polyoxypropylene chains and block copolymer chains of polyoxyethylene and polyoxypropylene. Said polyoxyalkylene chain preferably has a number average molecular weight typically within the range of 300 to 20,000, particularly 350 to 10,000 and more particularly 400 to 4,000 in consideration of the balance between the effects of the hydrophilic groups and paint film performance (and particular water resistance).

There are no particular limitations on the urethane compound (A) and any compound can be used provided it contains at least two (meth)acryloyl groups and a polyoxyalkylene chain in a molecule thereof, and a reaction product of a polyisocyanate compound (a-1), a polyalkylene glycol (a-2), and a compound (a-3) containing a hydroxyl group and a (meth)acryloyl group, is preferable.

The polyisocyanate compound (a-1) is a compound containing at least two isocyanate groups in a molecule thereof, examples of which include aliphatic polyisocyanates such as hexamethylene diisocyanate, trimethyl hexamethylene diisocyanate, dimer acid diisocyanate or lysine diisocyanate, and Biuret type addition products and isocyanurate ring addition products of these polyisocyanates; alicyclic diisocyanates such as isophorone diisocyanate, 4,4'-methylenebis(cyclohexylisocyanate), methylcyclohexane-2,4- or 2,6-diisocyanate, 1,3- or 1,4-di(isocyanatomethyl)cyclohexane, 1,4-cyclohexane diisocyanate, 1,3-cyclopentane diisocyanate or 1,2-cyclohexane diisocyanate, and Biuret type addition products and isocyanurate ring addition products of these polyisocyanates; and urethanation addition products obtained by reacting a polyisocyanate compound at a ratio such that the isocyanate groups are in excess with respect to the hydroxyl groups of a polyol such as ethylene glycol, propylene glycol, 1,4-butylene glycol, dimethylol propionic acid, polyalkylene glycol, trimethylol propane or hexanetriol, and Biuret type addition products and isocyanurate ring addition products of these urethanation addition products. These can each be used alone or two or more types can be used in combination.

Examples of the polyalkylene glycol (a-2) include polyethylene glycol, polypropylene glycol or polyethylene polypropylene glycol, and these can typically have a number average molecular weight within the range of 300 to 20,000, preferably 350 to 10,000 and more preferably 400 to 4,000, and may be used in combination with low molecular weight polyols other than the polyalkylene glycol such as 1,6-hexanediol or trimethylol propane.

The compound (a-3) containing a hydroxyl group and (meth)acryloyl group includes compounds having one hydroxyl group and one polymerizable unsaturated group in a molecule thereof, specific examples of which include (meth)acrylates having a hydroxyl group such as $C_2$ to $C_8$ hydroxyalkyl (meth)acrylates such as 2-hydroxyethyl (meth)acrylate, 2-hydroxypropyl (meth)acrylate, 3-hydroxypropyl (meth)acrylate or hydroxybutyl (meth)acrylate, or ε-caprolactone-modified forms of the $C_2$ to $C_8$ hydroxyalkyl (meth)acrylates; and (meth)acrylates having a polyoxyethylene chain in which a molecule terminal is a hydroxyl group. These can each be used alone or two or more types can be used in combination.

Furthermore, in the present description, "(meth)acryloyl" refers to "acryloyl or methacryloyl", while "(meth)acrylate" refers to "acrylate or methacrylate".

A reaction product of the polyisocyanate compound (a-1), the polyalkylene glycol (a-2) and the compound (a-3) containing a hydroxyl group and a (meth)acryloyl group can be produced using a known method, examples of which include a method in which the polyisocyanate compound (a-1), the polyalkylene glycol (a-2) and the compound (a-3) containing a hydroxyl group and a (meth)acryloyl group are mixed and reacted all at once; a method in which the polyisocyanate compound (a-1) and the polyalkylene glycol (a-2) are first reacted to form a urethane isocyanate prepolymer containing at least one isocyanate group per molecule, followed by reacting the prepolymer with the compound (a-3) containing a hydroxyl group and a (meth)acryloyl group; and a method in which the polyisocyanate compound (a-1) and the compound (a-3) containing a hydroxyl group and a (meth)acryloyl group are first reacted to form a urethane isocyanate prepolymer containing at least one isocyanate group per molecule, followed by reacting the prepolymer with the polyalkylene glycol (a-2). Furthermore, in the case of combining the polyalkylene glycol (a-2) with the use of a low molecular weight polyol as well, the reaction can be carried out in the same manner as described above.

The reaction ratio of the polyisocyanate compound (a-1), the polyalkylene glycol (a-2) and the compound (a-3) containing a hydroxyl group and a (meth)acryloyl group can be suitably altered corresponding to, for example, the desired number of (meth)acryloyl groups in the urethane compound (A). For example, in the case of desiring the compound (A) to contain two (meth)acryloyl groups, 1 to 15 moles, and preferably 1 to 5 moles, of the polyalkylene glycol (a-2), or mixture thereof with a low molecular weight polyol, and 2 to 16 moles, and preferably 2 to 5 moles, of the polyisocyanate compound (a-1), can be reacted with 2 moles of the compound (a-3) containing a hydroxyl group and a (meth)acryloyl group. In this reaction, a urethanation catalyst such as an organic tin compound or a polymerization inhibitor such as hydroquinone can be used as necessary. Said reaction can ordinarily be carried out at a temperature of about 60 to 100° C.

In consideration of anti-fogging performance, water resistance and other coated film performance, the urethane compound (A) preferably has a weight average molecular weight typically within the range of 800 to 30,000, preferably 900 to 18,000 and more preferably 1,000 to 6,000. In the present description, weight average molecular weight is the value obtained by converting the weight average molecular weight as determined by gel permeation chromatography at a flow rate of 1.0 ml/min using tetrahydrofuran as the eluent based on the weight average molecular weight of polystyrene. The HLC8120GPC (trade name, Tosoh Corporation) can be used for the gel permeation chromatography apparatus. In addition, four columns consisting of the TSKgel G-4000H×L, TSKgel G-3000H×L, TSKgel G-2500H×L and TSKgel G-2000H×L (trade names, all available from Tosoh Corporation) are used as the columns for gel permeation chromatography.

Compound (B) Having at Least Two (Meth)Acryloyl Groups and at Least Two Hydroxyl Groups in a Molecule Thereof:

Compound (B) used in the composition of the present invention, having at least two, and preferably two, (meth)acryloyl groups and at least two hydroxyl groups in a molecule thereof, is obtained by reacting at least two components consisting of an epoxy compound (b-1) and (meth)acrylic acid (b-2).

The epoxy compound (b-1) includes compounds containing at least two, and preferably two, epoxy groups in a molecule thereof, specific examples of which include diglycidyl ethers such as ethylene glycol diglycidyl ether, diethylene glycol diglycidyl ether, polyethylene glycol diglycidyl ether, propylene glycol diglycidyl ether, dipropylene glycol diglycidyl ether, polypropylene glycol diglycidyl ether, neopentyl glycol diglycidyl ether, 1,6-hexanediol diglycidyl ether, polytetramethylene glycol diglycidyl ether, bisphenol A diglycidyl ether, bisphenol A-ethylene oxide (EO) addition product diglycidyl ether, bisphenol A-propylene oxide (PO) addition product diglycidyl ether, hydrogenated bisphenol A diglycidyl ether, hydrogenated bisphenol A-EO addition product diglycidyl ether, hydrogenated bisphenol A-PO addition product diglycidyl ether, bisphenol F diglycidyl ether, bisphenol F-EO addition product diglycidyl ether, bisphenol F-PO addition product diglycidyl ether, hydrogenated bisphenol F diglycidyl ether, hydrogenated bisphenol F-EO addition product diglycidyl ether, hydrogenated bisphenol F-PO addition product diglycidyl ether, hydroxyquinone diglycidyl ether, spiroglycol diglycidyl ether, diglycidyl ethers of terminal hydroxyl group-containing liquid polybutadienes or polycaprolactone diglycidyl ether; di- or triglycidyl ethers of glycerin, triglycidyl ethers of trimethylol propane, polyglycidyl ethers of pentaerythritol, polyglycidyl ethers of sorbitol or polyglycidyl ethers of sorbitan; and diglycidyl esters obtained by reacting epichlorohydrin with polyvalent carboxylic acids such as succinic acid, adipic acid, suberic acid, azelaic acid, sebacic acid, phthalic acid, isophthalic acid, tetrahydrophthalic acid, maleic acid or fumaric acid, and these can each be used alone or two or more types can be used in combination. Among these, diglycidyl ethers having a polyoxyalkylene chain are used particularly preferably in consideration of anti-fogging performance. These epoxy compounds (b-1) can ordinarily have a number average molecular weight within the range of 100 to 5,000 and preferably 200 to 1,000.

In addition to the two components of epoxy compound (b-1) and (meth)acrylic acid (b-2), a polyvalent carboxylic acid (b-3) can also be used as a production raw material of the compound (B) as necessary. Examples of the polycarboxylic acid (b-3) include succinic acid, adipic acid, suberic acid, azelaic acid, sebacic acid, phthalic acid, isophthalic acid, tetrahydrophthalic acid, hexahydrophthalic acid, maleic acid, fumaric acid, trimellitic acid, citric acid and malic acid, and that containing 2 or 3 carboxyl groups and 4 to 20 carbon atoms in a molecule thereof is particularly preferable.

The reaction of the epoxy compound (b-1), the (meth) acrylic acid (b-2) and the polyvalent carboxylic acid (b-3), used as necessary, can be carried out without limitation, and a known method can be used. For example, the epoxy compound (b-1), the (meth)acrylic acid (b-2), and as necessary, the polyvalent carboxylic acid (b-3) can be mixed in an organic solvent or without any organic solvent followed by heating and stirring at a temperature of about 60 to 140° C. in the presence of a catalyst. In the case of using an organic solvent, the solvent is preferably removed by distilling off under reduced pressure after the reaction. Here, examples of organic solvents include benzene, toluene, xylene, cyclohexane, butyl acetate, methyl ethyl ketone and methyl isobutyl ketone. In addition, examples of catalysts include tertiary amines such as N,N-dimethylbenzylamine, triethylamine or N,N-dimethylaniline; quaternary ammonium salts such as tetradiethylammonium chloride, tetrabutylammonium chloride or benzyltrimethylammonium chloride; hydrochlorides of secondary amines such as dimethylamine hydrochloride or diethylamine hydrochloride; and phosphorous compounds such as triphenylphosphine. The above-mentioned reaction can also be carried out in the presence of a polymerization inhibitor such as hydroquinone as necessary.

In the above-mentioned reaction, the reaction ratio of the epoxy compound (b-1), the (meth)acrylic acid (b-2) and the polyvalent carboxylic acid (b-3) can be varied according to the desired number of (meth)acryloyl groups for compound (B) and by using or not using the polyvalent carboxylic acid (b-3). For example, in the case of not using the polyvalent carboxylic acid (b-3) and desiring compound (B) to contain two (meth)acryloyl groups, the reaction ratio of the epoxy compound (b-1) to the (meth)acrylic acid (b-2) can be made to be 0.8 to 1.2 moles, and preferably 0.9 to 1.1 moles, of the epoxy compound (b-1) to 2 moles of the (meth)acrylic acid (b-2). In addition, in the case of using the polyvalent carboxylic acid (b-3) and desiring compound (B) to contain two (meth)acryloyl groups, the ratio can be made to be 1.8 to 2.2 moles, and preferably 1.9 to 2.1 moles, of the epoxy compound and 0.8 to 1.2 moles, and preferably 0.9 to 1.1 moles, of the polyvalent carboxylic acid to 2 moles of the (meth) acrylic acid (b-2).

Compound (B) can ordinarily have a hydroxyl value within the range of 50 to 500 mgKOH/g, preferably 60 to 480 mgKOH/g and more preferably 80 to 450 mgKOH/g, and can have a number average molecular weight within the range of 250 to 10,000, preferably 300 to 8,000 and more preferably 400 to 5,000.

Compound (C) Having an Ethylenic Unsaturated Group Other than Components (A) and (B):

The compound (C) having an ethylenic unsaturated group used in the present invention includes compounds other than components (A) and (B) having at least one ethylenic unsaturated group in a molecule thereof. Examples of ethylenic unsaturated groups include (meth)acryloyl, allyl and vinyl groups, with a (meth)acryloyl group being particularly preferable.

In the present invention, in consideration of long-term water resistance and adhesion in particular, a urethane compound (C-1) is preferably used as at least a portion of the compound (C) that is obtained by reacting a polyisocyanate compound (c-1), a hydrophobic polyol (c-2), and a compound (c-3) containing a hydroxyl group and a (meth)acryloyl group. Said urethane compound (C-1) preferably contains at least two, and preferably two, (meth)acryloyl groups in a molecule thereof.

The polyisocyanate compound (c-1) and the compound (c-3) containing a hydroxyl group and a (meth)acryloyl group can be suitably selected and used from the examples of the polyisocyanate compound (a-1) and the compound (a-3) containing a hydroxyl group and a (meth)acryloyl group, respectively, listed in the explanation of the urethane compound (A).

Examples of the hydrophobic polyol (c-2) include polyester polyols, polyether polyols other than polyalkylene glycol, polycarbonates and silicon polyols, and these can each be used alone or two or more types can be used in combination. Among these, polyester polyols are preferable, and polyester diols are particularly preferable in terms of controlling the reaction. Said polyester polyols can be obtained by reacting a polyvalent alcohol and a polyvalent carboxylic acid, or by reacting a polyvalent alcohol and a cyclic ester compound. Examples of the polyvalent alcohol include ethylene glycol, 1,2-propylene glycol, 1,3-propylene glycol, 1,4-butanediol, 1,3-butanediol, 1,4-butenediol, 1,4-butinediol, 1,5-pentanediol, 1,6-hexanediol, 1,8-octanediol, neopentyl glycol, 1,3-cyclohexanediol, 2-methyl-1,3-propanediol, 2-butyl-2-ethyl-1,3-propanediol, diethylene glycol, triethylene glycol, tetraethylene glycol, dipropylene glycol, dibutylene glycol, trimethylol propane and pentaerythritol. In addition, examples of the polyvalent carboxylic acid include succinic acid, adipic acid, suberic acid, azelaic acid, sebacic acid, phthalic acid, isophthalic acid, phthalic anhydride, tetrahydrophthalic anhydride, hexahydrophthalic anhydride, tetrachlorophthalic anhydride, tetrahydrophthalic acid, glutaric anhydride, maleic acid, maleic anhydride and fumaric acid, while examples of the cyclic ester compound include ε-caprolactone.

The above-mentioned polyester polyol preferably has a weight average molecular weight typically within the range of 200 to 10,000, particularly 350 to 6,500 and more particularly 500 to 3,000 in view of anti-fogging property and water resistance.

The above-mentioned urethane compound (C-1) can be produced in the same manner as the case of the above-mentioned urethane compound (A). The reaction ratio of each component at that time can be varied according to the desired number of (meth)acryloyl groups in the urethane compound (C-1), and for example, in the case of producing the urethane compound (C-1) containing two (meth)acryloyl groups, the reaction ratio can be 1 to 15 moles, and preferably 1 to 10 moles, of the hydrophobic polyol (c-2) and 2 to 16 moles, and preferably 2 to 11 moles, of the polyisocyanate compound (c-1) to 2 moles of the compound (c-3) containing a hydroxyl group and a (meth)acryloyl group.

In consideration of anti-fogging performance and water resistance, the urethane compound (C-1) preferably has a weight average molecular weight typically within the range of 600 to 11,000, particularly 800 to 7,500 and more particularly 1,000 to 4,000.

In addition to the urethane compound (C-1), examples of the compound (C) that can be used include mono(meth)acrylate compounds and di- or poly(meth)acrylate compounds, styrene, vinyl toluene, vinyl acetate, vinyl chloride and allyl alcohols. In particular, mono(meth)acrylate compounds and di- or poly(meth)acrylate compounds are preferable.

Examples of the above-mentioned mono(meth)acrylate compounds include tetrahydrofurfuryl (meth)acrylate, acryloyl morpholine, isobornyl (meth)acrylate, phenoxyethyl (meth)acrylate, phenoxyethoxyethyl (meth)acrylate and nonylphenoxyethyl (meth)acrylate; hydroxyalkyl (meth)acrylates such as hydroxyethyl (meth)acrylate, hydroxypropyl (meth)acrylate or hydroxybutyl (meth)acrylate; polyalkylene glycol monohydroxy mono(meth)acrylates such as polyethylene glycol monohydroxy mono(meth)acrylate or polypropylene glycol monohydroxy mono(meth)acrylate; polypropylene glycol di(meth)acrylates; succinic acid addition products of hydroxyethyl (meth)acrylate, succinic acid addition products of hydroxypropyl (meth)acrylate, and phenyl glycidyl ether addition products of (meth)acrylic acid.

In addition, examples of the above-mentioned di- or poly (meth)acrylate compounds include polyalkylene glycol (meth)acrylates such as monomers having two (meth)acryloyl groups in the manner of di(meth)acrylates of ethylene oxide or propylene oxide addition products such as diethylene glycol di(meth)acrylate, triethylene glycol di(meth)acrylate, polyethylene glycol di(meth)acrylate, dipropylene glycol di(meth)acrylate, tripropylene glycol di(meth)acrylate or tetrapropylene glycol di(meth)acrylate; and monomers having three (meth)acryloyl groups comprising the addition of ethylene oxide or propylene oxide to trimethylol propane tri(meth)acrylate, tetramethylol methane tri(meth)acrylate, pentaerythritol tri(meth)acrylate or glycerin tri(meth)acrylate; and di- or polyacrylates obtained by reacting acrylic acid with an alkyl diol such as monomers having two (meth) acryloyl groups such as ethylene glycol di(meth)acrylate, 1,4-butanediol di(meth)acrylate, 1,3-butanediol di(meth) acrylate, neopentyl glycol di(meth)acrylate, 1,5-pentanediol di(meth)acrylate, 1,6-hexanediol di(meth)acrylate, 1,9-nonanediol di(meth)acrylate, 1,10-decanediol di(meth)acrylate, dibromoneopentyl glycol di(meth)acrylate, glycerin di(meth)acrylate, dimethylol dicyclopentane di(meth)acrylate or dimethylol tricyclodecane di(meth)acrylate; monomers having three (meth)acryloyl groups such as trimethylol propane tri(meth)acrylate, tetramethylol methane tri(meth) acrylate, pentaerythritol tri(meth)acrylate or glycerin tri (meth)acrylate; and monomers having four or more (meth) acryloyl groups such as tetramethylol methane tetra(meth) acrylate, pentaerythritol tetra(meth)acrylate, ditrimethylol propane tetra(meth)acrylate or dipentaerythritol penta(meth) acrylate or dipentaerythritol hexa(meth)acrylate. These can each be used alone or two or more types can be used in combination.

Photopolymerization Initiator (D):

There are no particular limitations on the photopolymerization initiator (D) used in the composition of the present invention provided it is activated by ultraviolet light and/or visible light, and known photopolymerization initiators can be used, specific examples of which include 1-hydroxycyclohexyl phenyl ketone, 2-hydroxy-2-methyl-1-phenylpropan-1-one, diethoxyacetophenone, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl (2-hydroxy-2-propyl)ketone, 2-methyl-1-[4-(methylthio)phenyl]-2-morpholinopropane-1, benzoin, benzoin methyl ether, benzoin ethyl ether, benzoin isopropyl ether, benzoin n-butyl ether, benzoin phenyl ether, benzyl dimethyl ketal, benzophenone, benzoyl benzoate, benzoyl methyl benzoate, 4-phenylbenzophenone, hydroxybenzophenone, 4-benzoyl-4'-methyldiphenyl sulfide, 3,3,'-dimethyl-4-methoxybenzophenone, thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, bis(2,4,6-trimethylbenzoyl)phenyl phosphine oxide, 2,4,6-trimethylbenzoyl-diphenyl phosphine oxide, methylphenyl glyoxylate, benzyl and camphor quinone. These can each be used alone or two or more types can be used in combination.

Photocurable Composition for Forming an Anti-Fogging Coating:

The photocurable composition for forming an anti-fogging coating of the present invention can be prepared by mixing the previously described compound (A), compound (B) and compound (C) in accordance with ordinary methods. In general, the blending ratio of the compounds (A), (B) and (C) at that time is preferably within the ranges indicated below based on the total solid weight of components (A), (B) and (C) in consideration of being able to ensure long-term anti-fogging performance and adhesion even in high-temperature and high-humidity atmospheres.

Compound (A): 10 to 90% by weight, particularly 15 to 80% by weight, and more particularly 20 to 70% by weight Compound (B): 5 to 85% by weight, particularly 10 to 70% by weight, and more particularly 10 to 60% by weight Compound (C): 5 to 85% by weight, particularly 10 to 75% by weight, and more particularly 20 to 70% by weight In addition, in the case of using the compound (C-1) for at least a portion of the compound (C), the blended amount thereof is preferably within the range of typically 5 to 70% by weight, particularly 5 to 50% by weight and more particularly 10 to 50% by weight based on the total solid weight of the compounds (A), (B) and (C) in consideration of long-term water resistance and anti-fogging performance.

On the other hand, the blended amount of the photopolymerization initiator (D) is preferably within the range of 0.1 to 20 parts by weight, particularly 0.5 to 10 parts by weight and more particularly 1 to 8 parts by weight based on 100 parts by weight of the total solid content of compounds (A), (B) and (C).

A surfactant can also be incorporated in the composition of the present invention as necessary. At least one type of surfactant selected from, for example, nonionic surfactants, anionic surfactants and cationic surfactants can be used for the surfactant. Among these, nonionic surfactants and anionic surfactants are preferable in terms of sustaining anti-fogging effects. In addition, these surfactants may also be reactive surfactants having an unsaturated group.

Examples of the above-mentioned nonionic surfactants include polyoxyethylene higher alcohol ethers such as polyoxyethylene lauryl alcohol, polyoxyethylene lauryl ether or polyoxyethylene oleyl ether; polyoxyethylene alkyl aryl ethers such as polyoxyethylene octyl phenol or polyoxyethyelene nonyl phenol; polyoxyethylene acyl esters such as polyoxyethylene glycol monostearate; polyoxyethylene sorbitan fatty acid esters such as polypropylene glycol ethylene oxide addition products, polyoxyethylene sorbitan monolaurate or polyoxyethylene sorbitan monostearate; phosphoric acid esters such as alkyl phosphate esters or polyoxyethylene alkyl ether phosphate esters; and sugar esters, cellulose esters and polyether(polyoxyethylene)-modified silicone oils.

Examples of the anionic surfactants include fatty acid salts such as sodium oleate or potassium oleate; higher alcohol sulfuric acid esters such as sodium lauryl sulfate or ammonium lauryl sulfate; alkylbenzene sulfonic acid salts and alkylnapthalene sulfonic acid salts such as sodium dodecylbenzene sulfonate or sodium alkylnaphthalene sulfonate; and naphthalene sulfonic acid formalin condensation products, dialkyl sulfosuccinates, dialkyl phosphates or polyoxyethylene sulfates such as sodium polyoxyethylene alkyl phenyl ethers.

Examples of the cationic surfactants include amine salts such as ethanolamine salts, laurylamine acetate, triethanolamine monoformate or stearamide ethyl diethylamine acetate; and quaternary ammonium salts such as lauryl trimethyl ammonium chloride, stearyl trimethyl ammonium chloride, dilauryl dimethyl ammonium chloride, distearyl dimethyl ammonium chloride, lauryl dimethyl benzyl ammonium chloride or stearyl dimethyl benzyl ammonium chloride.

The blended amount of the above-mentioned surfactants can typically be within the range of 0.1 to 30 parts by weight, preferably 0.15 to 20 parts by weight and more preferably 0.2 to 10 parts by weight based on 100 parts by weight of the total solid content of the compounds (A), (B) and (C) in consideration of anti-fogging performance and water resistance.

A rheology control agent can also be incorporated into the composition of the present invention as necessary. A known rheology control agent can be used without limitation for the rheology control agent, and examples include at least one type selected from organic fine particles and inorganic fine particles. Examples of organic fine particles that can be used include resin particles such as known polymer beads, finely crushed products of polymers of the above-mentioned monomers, and gelled polymer fine particles (see, for example, Japanese Patent Application Laid-open No. Hei 3 (1991)-66770). In addition, examples of inorganic fine particles that can be used include inorganic oxide particles such as colloidal or amorphous silica or alumina, with colloidal silica being able to be used particularly preferably in consideration of ensuring transparency.

Colloidal silica is a sol in which colloidal particles of silica are dispersed in water or an organic solvent such as methyl alcohol, ethyl alcohol, n-propyl alcohol, isopropyl alcohol, methyl isobutyl ketone or methyl ethyl ketone, and may have a spherical structure or chain-like structure. In addition, colloidal silica in which the silica has undergone some form of surface modification with a surface modifier such as a silane coupling agent can also be used. Examples of the silane coupling agent include methyl trimethoxysilane, dimethyl dimethoxysilane, methyl triethoxysilane, dimethyl diethoxysilane, vinyl trimethoxysilane, γ-acryloyloxypropyl trimethoxysilane, γ-methacryloyloxypropyl trimethoxysilane, γ-glycidoxypropyl trimethoxysilane and γ-aminopropyl trimethoxysilane.

The blended amount of the above-mentioned rheology control agent is preferably within the range of typically 3 to 200 parts by weight, particularly 3 to 150 parts by weight and more particularly 3 to 100 parts by weight based on 100 parts by weight of the total solid content of the compounds (A), (B) and (C) in consideration of coating workability and finish.

A photosensitizer, surface adjuster, antioxidant, ultraviolet absorber or organic solvent and so on can also be incorporated in the composition of the present invention as necessary.

Method for Forming Anti-Fogging Coating:

According to the present invention, an anti-fogging coating can be formed on the surface of a base material by applying a photocurable composition for forming an anti-fogging coating obtained in the manner described above to the surface of a base material followed by irradiating with light.

There are no particular limitations on the base material to which the composition of the present invention can be applied, and examples include plastic materials such as polycarbonates, polyacrylates or polymethacrylates, as well as glass and metal.

Application of the composition of the present invention to the surface of a base material can be carried out using a known method, examples of which include spray coating, flow coating, roll coating, bar coating and dip coating. The surface of a base material to which the composition has been applied may be preheated for about 1 to 10 minutes at a temperature of about 60 to 120° C. as necessary. There are no particular limitations on the thickness of the coated film, and although the thickness can be varied according to the application of the resulting coated article, the dry (cured) film thickness is normally within the range of 1 to 15 μm and preferably 3 to 10 μm.

Next, the coated film is cured by irradiating with light to form an anti-fogging coating. Examples of the irradiated light include ultraviolet light and visible light, and that containing light of a wavelength within the range of 200 to 500 nm is used particularly preferably. Examples of irradiation light sources that can be used include high-pressure mercury lamps, ultra-high-pressure mercury lamps, xenon lamps, carbon arc lamps, halogen lamps, metal halide lamps and sunlight. In addition, although varying according to the type of photocurable composition used and thickness of the coated film, the dose of the irradiated light is normally within the range of 10 to 2000 mJ/cm$^2$, particularly 100 to 1500 mJ/cm$^2$ and more particularly 100 to 1000 mJ/cm$^2$ as the cumulative dose.

The above-mentioned irradiation with light can be carried out in air or in a carbon dioxide atmosphere. By carrying out irradiation with light in a carbon dioxide atmosphere in particular, radical polymerizable (meth)acryloyl group-containing compounds present on the surface of the coated film or in the vicinity thereof are no longer susceptible to inhibition of curing by oxygen, thereby making it possible to form a cured surface having extremely superior surface curability, and particularly resistance to friction (scratch resistance).

An example of a method for carrying out irradiation with light in a carbon dioxide atmosphere consists of introducing carbon dioxide gas into a container or generating carbon dioxide by placing dry ice in the bottom of a container to replace the air in the container with carbon dioxide followed by placing the base material on which the coated film has been formed in the container and irradiating with light. The radiation source is placed inside or above the container, or in the case the container is made of a material enabling transmission of ultraviolet light or visible light in the manner of quartz glass, the radiation source is placed outside the container to allow irradiation with light. The oxygen content in the carbon dioxide atmosphere is preferably 15% by volume or less and particularly preferably 10% by volume or less based on the total gas volume in the atmosphere in consideration of preventing inhibition of curing.

As a result of irradiating with light in a carbon dioxide atmosphere, since the carbon dioxide, which is heavier than air, accumulates in the container, it is not necessary to seal the container, thereby enabling continuous production of coated articles.

Thus, a coated articles can be obtained that is coated with an anti-fogging coating, examples of which include headlight covers, goggles, helmet face shields, anti-fogging films, mirrors and lenses.

Although the following provides a more detailed explanation of the present invention through examples thereof, the present invention is not limited to only these examples. Furthermore, the terms "parts" and "%" refer to "parts by weight" and "% by weight" unless indicated otherwise.

PRODUCTION EXAMPLE 1

1000 g of polyethylene glycol having a molecular weight of about 2,000 and 168 g (1 mole) of hexamethylene diisocyanate were placed in a reaction vessel and reacted for 2 hours at 80° C. Moreover, 116 g (1 mole) of 2-hydroxyethyl acrylate and 4.7 g of hydroquinone were added thereto and reacted for 3 hours at 80° C. while blowing in air to obtain a urethane acrylate (A-1) having acryloyl groups on both ends of a molecule thereof. The weight average molecular weight of the urethane acrylate (A-1) was 3,800.

PRODUCTION EXAMPLE 2

500 g of polyethylene glycol having a molecular weight of about 1,000 and 168 g (1 mole) of hexamethylene diisocyanate were placed in a reaction vessel and reacted for 2 hours at 80° C. Moreover, 116 g (1 mole) of 2-hydroxyethyl acrylate and 1.7 g of hydroquinone were added thereto and reacted for 3 hours at 80° C. while blowing in air to obtain a urethane acrylate (A-2) having acryloyl groups on both ends of a molecule thereof. The weight average molecular weight of the urethane acrylate (A-2) was 1,900.

PRODUCTION EXAMPLE 3

200 g of polyethylene glycol diglycidyl ether having a molecular weight of about 400, 72 g (1 mole) of acrylic acid, 1.36 g of tetrabutyl ammonium chloride and 0.5 g of hydroquinone were placed in a reaction vessel and reacted for 8 hours at 110° C. while blowing in air to obtain a compound (B-1) having acryloyl groups on both ends of a molecule thereof.

PRODUCTION EXAMPLE 4

192.4 g of 1,6-hexanediol and 166.6 g of adipic acid were placed in a reaction vessel and reacted for 6 hours at 220° C. while dehydrating and condensing to obtain 318 g of polyester. 222 g (1 mole) of isophorone diisocyanate were added thereto and reacted for 2 hours at 80° C. Moreover, 116 g (1 mole) of 2-hydroxyethyl acrylate and 1.4 g of hydroquinone were further added thereto and reacted for 3 hours at 80° C. while blowing in air to obtain a urethane acrylate (C-1) having acryloyl groups on both ends of a molecule thereof.

EXAMPLES 1 TO 7 AND COMPARATIVE EXAMPLES 1 AND 2

The components shown in Table 1 below were blended at the ratios (parts) shown in Table 1 followed by dispersion, mixing and stirring to produce coating compositions (1) to (13). Furthermore, notes 1 to 11 in Table 1 are as indicated below.
- Note 1: M-211B: Toagosei, diacrylate of a 1:2 mole addition product of bisphenol A and polyethylene glycol
- Note 2: IRR-214: Daicel-UCB, dimethylol dicyclopentane diacrylate
- Note 3: M-305: Toagosei, pentaerythritol triacrylate
- Note 4: M-402: Toagosei, dipentaerythritol hexaacrylate
- Note 5: Irgacure 184: Ciba Specialty Chemicals, photo-radical polymerization initiator, 1-hydroxycyclohexyl phenyl ketone
- Note 6: Disparlon LC-975: Kusumoto Chemicals, surface adjuster
- Note 7: Irganox 1010: Ciba Specialty Chemicals, antioxidant
- Note 8: Pelex OT-P: Kao Corp., anionic surfactant, non-volatile content: 70%
- Note 9: Nonion E-215: NOF Corp., nonionic surfactant
- Note 10: MEK-ST: Nissan Chemical Industries, colloidal silica, non-volatile content: 30%
- Note 11: Surface-modified colloidal silica: Obtained by adding 3 g of KBM-5103 (Shin-Etsu Silicone, γ-acryloyloxypropyl trimethoxysilane) and 0.12 g of hydroquinone to 200 g of MEK-ST followed by reacting for 8 hours at 76° C. while blowing in air.

TABLE 1

| | Examples | | | | | | | | | | | Comparative Examples | |
|---|---|---|---|---|---|---|---|---|---|---|---|---|---|
| | 1 | 2 | 3 | 4 | 5 | 6 | 7 | 8 | 9 | 10 | 11 | 1 | 2 |
| Coating Composition | (1) | (2) | (3) | (4) | (5) | (6) | (7) | (8) | (9) | (10) | (11) | (12) | (13) |
| Urethane acrylate (A-1) | 40 | | 50 | 40 | 40 | 40 | 40 | 40 | 40 | 40 | 40 | | 40 |
| Urethane acrylate (A-2) | | 40 | | | | | | | | | | | |
| Compound (B-1) | 20 | 20 | 10 | 10 | 20 | 20 | 10 | 20 | 20 | 20 | 20 | 20 | |
| Urethane acrylate (C-1) | 30 | 30 | 30 | 30 | 20 | 20 | 30 | 30 | 30 | 30 | 30 | 70 | 30 |
| Acryloyl morpholine | | | | 10 | | | | | | | | | |

TABLE 1-continued

|  | Examples | | | | | | | | | | | Comparative Examples | |
| --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 1 | 2 |
| Tetrahydro-furfuryl acrylate |  |  |  |  |  |  | 10 |  |  |  |  |  |  |
| M-211B (Note 1) |  |  |  |  | 10 |  |  |  |  |  |  |  | 20 |
| IRR-214 (Note 2) |  |  |  |  |  | 10 |  |  |  |  |  |  |  |
| M-305 (Note 3) |  |  |  |  | 10 | 10 |  |  |  |  |  |  |  |
| M-402 (Note 4) | 10 | 10 | 10 | 10 |  |  | 10 | 10 | 10 | 10 | 10 | 10 | 10 |
| Irgacure 184 (Note 5) | 5 | 5 | 5 | 5 | 5 | 5 | 5 | 5 | 5 | 5 | 5 | 5 | 5 |
| Disparlon LC-975 (Note 6) | 0.5 | 0.5 | 0.5 | 0.5 | 0.5 | 0.5 | 0.5 | 0.5 | 0.5 | 0.5 | 0.5 | 0.5 | 0.5 |
| Irganox 1010 (Note 7) | 1 | 1 | 1 | 1 | 1 | 1 | 1 | 1 | 1 | 1 | 1 | 1 | 1 |
| Pelex OT-P (Note 8) |  |  |  |  |  |  |  |  | 2 |  |  |  |  |
| Nonion E-215 (Note 9) |  |  |  |  |  |  |  |  |  | 2 |  |  |  |
| Colloidal silica MEK-ST (Note 10) |  |  |  |  |  |  |  |  |  | 10 |  |  |  |
| Surface-modified colloidal silica (Note 11) |  |  |  |  |  |  |  |  |  |  | 10 |  |  |

Each of the coating compositions of the examples and comparative examples obtained above were diluted with propylene glycol monomethyl ether to a non-volatile content of 30% followed by spray coating onto a polycarbonate plate to a dry film thickness of about 5 to 7 μm and preheating for 5 minutes at 80° C. Next, the coated film was irradiated with light from a distance of 5.5 cm with a metal halide lamp (output: 240 W/cm) in air using an ultraviolet irradiation system manufactured by Fusion UV Systems (cumulative dose: 500 mJ/cm²).

The anti-fogging performance, appearance of the coated film and adhesion of each of the resulting test coated plates were evaluated according to the methods and criteria indicated below initially (immediately after ultraviolet curing), after a heat resistance test (carried out by allowing each test coated plate to stand for 10 days in an atmosphere at 120° C.), after a water resistance test (carried out by immersing each test coated plate in warm water at 40° C. for 10 days) and after a humidity resistance test (carried out by allowing each test coated plate to stand for 10 days in an atmosphere at a temperature of 40° C. and relative humidity of 95%), respectively. Furthermore, dryness to the touch was also evaluated initially. The results are shown in Table 2.

(*1) Anti-fogging performance: The coated surface of each test coated plate was breathed on for 2 seconds from a distance of 5 cm in a constant temperature chamber at 20° C. followed by measuring the amount of time until fogging disappeared. Disappearance of fogging within 5 seconds was evaluated as ○, disappearance of fogging in 6 to 20 seconds was evaluated as Δ, and disappearance of fogging is 21 seconds or more was evaluated as x.

(*2) Appearance of coated film: The coated surface of each test coated plate was evaluated visually. The absence of abnormalities was evaluated as ○, slight turbidity was evaluated as Δ, and prominent turbidity was evaluated as x.

(*3) Adhesion: Lines extending to the base material were made with a cutter in the coated surface of each test coated plate to form 100 squares measuring 2 mm×2 mm. Pressure-sensitive adhesive cellophane tape was then adhered to the surface thereof followed by rapidly peeling off the tape at 20° C. to investigate the number of squares where the coated film remained. The complete absence of separation was evaluated as ○, and the separation of 1 or more squares was evaluated as x.

(*4) Dryness to the touch: The stickiness of each test coated plate immediately after curing was investigated by touching. The absence of surface stickiness was evaluated as ○, and the presence of surface stickiness was evaluated as x.

TABLE 2

|  |  | Examples | | | | | | | | | | | Comparative Examples | |
| --- | --- | --- | --- | --- | --- | --- | --- | --- | --- | --- | --- | --- | --- | --- |
|  |  | 1 | 2 | 3 | 4 | 5 | 6 | 7 | 8 | 9 | 10 | 11 | 1 | 2 |
|  | Coating Composition | (1) | (2) | (3) | (4) | (5) | (6) | (7) | (8) | (9) | (10) | (11) | (12) | (13) |
| Initial | Anti-fogging performance | ○ | ○ | ○ | ○ | ○ | ○ | ○ | ○ | ○ | ○ | ○ | X | Δ |
|  | Appearance | ○ | ○ | ○ | ○ | ○ | ○ | ○ | ○ | ○ | ○ | ○ | ○ | ○ |
|  | Adhesion | ○ | ○ | ○ | ○ | ○ | ○ | ○ | ○ | ○ | ○ | ○ | ○ | ○ |
|  | Dryness to touch | ○ | ○ | ○ | ○ | ○ | ○ | ○ | ○ | ○ | ○ | ○ | ○ | ○ |

TABLE 2-continued

|  |  | Examples |  |  |  |  |  |  |  |  |  |  | Comparative Examples |  |
|---|---|---|---|---|---|---|---|---|---|---|---|---|---|---|
|  |  | 1 | 2 | 3 | 4 | 5 | 6 | 7 | 8 | 9 | 10 | 11 | 1 | 2 |
| Heat resistance test 120° C., 10 days | Anti-fogging performance | ○ | ○ | ○ | ○ | ○ | ○ | ○ | ○ | ○ | ○ | ○ | X | Δ |
|  | Appearance | ○ | ○ | ○ | ○ | ○ | ○ | ○ | ○ | ○ | ○ | ○ | ○ | ○ |
|  | Adhesion | ○ | ○ | ○ | ○ | ○ | ○ | ○ | ○ | ○ | ○ | ○ | ○ | ○ |
| Water resistance test, immersion at 40° C., 10 days | Anti-fogging performance | ○ | ○ | ○ | ○ | ○ | ○ | ○ | ○ | ○ | ○ | ○ | X | Δ |
|  | Appearance | ○ | ○ | ○ | ○ | ○ | ○ | ○ | ○ | ○ | ○ | ○ | ○ | ○ |
|  | Adhesion | ○ | ○ | ○ | ○ | ○ | ○ | ○ | ○ | ○ | ○ | ○ | ○ | ○ |
| Humidity resistance test 95% RH, 40° C., 10 days | Anti-fogging performance | ○ | ○ | ○ | ○ | ○ | ○ | ○ | ○ | ○ | ○ | ○ | X | Δ |
|  | Appearance | ○ | ○ | ○ | ○ | ○ | ○ | ○ | ○ | ○ | ○ | ○ | ○ | ○ |
|  | Adhesion | ○ | ○ | ○ | ○ | ○ | ○ | ○ | ○ | ○ | ○ | ○ | ○ | ○ |

EXAMPLES 12 TO 22 AND COMPARATIVE EXAMPLES 3 AND 4

After diluting each of the coating compositions (1) to (13) obtained in the above-mentioned Examples 1 to 11 and Comparative Examples 1 and 2 with propylene glycol monomethyl ether to a non-volatile content of 30%, the compositions were spray coated onto a polycarbonate plate to a dry film thickness of about 5 to 7 μm and preheated for 5 minutes at 80° C.

Next, each coated plate was placed in a tank filled with carbon dioxide, and irradiated from above the tank with light at an irradiation distance of 70 cm with a meal halide lamp (output: 100 W/cm) using an ultraviolet irradiation system manufactured by Iwasaki Electric (cumulative dose: 500 mJ/cm²). The volume of the tank was about 1 m³, and about 2 kg of dry ice were placed inside the tank. The oxygen content in the tank immediately before irradiating with light was about 5% by volume.

The anti-fogging performance, appearance of the coated film and adhesion of each of the resulting test coated plates were evaluated according to the previously described methods and criteria, while scratch resistance was evaluated according to the method and criteria indicated below, initially (immediately after ultraviolet curing), after a heat resistance test (carried out by allowing each test coated plate to stand for 10 days in an atmosphere at 120° C.), after a water resistance test (carried out by immersing each test coated plate in warm water at 40° C. for 10 days) and after a humidity resistance test (carried out by allowing each test coated plate to stand for 10 days in an atmosphere at a temperature of 40° C. and relative humidity of 95%), respectively. Furthermore, dryness to the touch was initially evaluated instead of scratch resistance. The results are shown in Table 3.

(*5) Scratch Resistance: The coated surface of each test coated plate was rubbed with the Wypall X70 Workhorse (Crecia, pulp/polypropylene non-woven fabric) within 1 hour after the water resistance test and humidity resistance test followed by visually evaluation of scratches left by the rubbing. The presence of residual scratches on the coated surface was evaluated as x, while the absence of any change in the coated surface was evaluated as ○.

TABLE 3

|  |  | Examples |  |  |  |  |  |  |  |  |  |  | Comparative Examples |  |
|---|---|---|---|---|---|---|---|---|---|---|---|---|---|---|
|  |  | 12 | 13 | 14 | 15 | 16 | 17 | 18 | 19 | 20 | 21 | 22 | 3 | 4 |
| Coating Composition |  | (1) | (2) | (3) | (4) | (5) | (6) | (7) | (8) | (9) | (10) | (11) | (12) | (13) |
| Irradiation Atmosphere |  | Presence of carbon dioxide |  |  |  |  |  |  |  |  |  |  | Presence of carbon dioxide |  |
| Initial | Anti-fogging performance | ○ | ○ | ○ | ○ | ○ | ○ | ○ | ○ | ○ | ○ | ○ | X | Δ |
|  | Cured film appearance | ○ | ○ | ○ | ○ | ○ | ○ | ○ | ○ | ○ | ○ | ○ | ○ | ○ |
|  | Adhesion | ○ | ○ | ○ | ○ | ○ | ○ | ○ | ○ | ○ | ○ | ○ | ○ | ○ |
|  | Dryness to touch | ○ | ○ | ○ | ○ | ○ | ○ | ○ | ○ | ○ | ○ | ○ | ○ | ○ |
| Heat resistance test 120° C., 10 days | Anti-fogging performance | ○ | ○ | ○ | ○ | ○ | ○ | ○ | ○ | ○ | ○ | ○ | X | Δ |
|  | Cured film appearance | ○ | ○ | ○ | ○ | ○ | ○ | ○ | ○ | ○ | ○ | ○ | ○ | ○ |
|  | Adhesion | ○ | ○ | ○ | ○ | ○ | ○ | ○ | ○ | ○ | ○ | ○ | ○ | ○ |

TABLE 3-continued

|  |  | Examples | | | | | | | | | | | Comparative Examples | |
| --- | --- | --- | --- | --- | --- | --- | --- | --- | --- | --- | --- | --- | --- | --- |
|  |  | 12 | 13 | 14 | 15 | 16 | 17 | 18 | 19 | 20 | 21 | 22 | 3 | 4 |
| Water resistance test, immersion at 40° C., 10 days | Anti-fogging performance | ○ | ○ | ○ | ○ | ○ | ○ | ○ | ○ | ○ | ○ | ○ | X | Δ |
|  | Cured film appearance | ○ | ○ | ○ | ○ | ○ | ○ | ○ | ○ | ○ | ○ | ○ | ○ | ○ |
|  | Scratch resistance | ○ | ○ | ○ | ○ | ○ | ○ | ○ | ○ | ○ | ○ | ○ | ○ | ○ |
|  | Adhesion | ○ | ○ | ○ | ○ | ○ | ○ | ○ | ○ | ○ | ○ | ○ | ○ | ○ |
| Humidity resistance test 95% RH, 40° C., 10 days | Anti-fogging performance | ○ | ○ | ○ | ○ | ○ | ○ | ○ | ○ | ○ | ○ | ○ | ○ | ○ |
|  | Cured film appearance | ○ | ○ | ○ | ○ | ○ | ○ | ○ | ○ | ○ | ○ | ○ | ○ | ○ |
|  | Scratch resistance | ○ | ○ | ○ | ○ | ○ | ○ | ○ | ○ | ○ | ○ | ○ | ○ | ○ |
|  | Adhesion | ○ | ○ | ○ | ○ | ○ | ○ | ○ | ○ | ○ | ○ | ○ | ○ | ○ |

The invention claimed is:

1. A photocurable composition for forming an anti-fogging coating, comprising:

(A) a urethane compound containing at least two (meth)acryloyl groups and a polyoxyalkylene chain in a molecule thereof;

(B) a compound having at least two (meth)acryloyl groups and at least two hydroxyl groups in a molecule thereof, obtained by reacting at least two components consisting of an epoxy compound and (meth)acrylic acid;

(C) a compound having an ethylenic unsaturated group other than the components (A) and (B); and (D) a photopolymerization initiator, the urethane compound (A) being a reaction product of a polyisocyanate compound (a-1), a polyalkylene glycol (a-2), and a compound (a-3) containing a hydroxyl group and a (meth)acryloyl group, at least a portion of the compound (C) being a urethane compound (C-1) obtained by reacting a polyisocyanate compound (c-1), a hydrophobic polyol (c-2) and a compound (c-3) containing a hydroxyl group and a (meth)acryloyl group, the hydrophobic polyol (c-2) being a polyester polyol obtained by reacting a polyvalent alcohol and a polyvalent carboxylic acid, the composition containing 20 to 70% by weight of the urethane compound (A), 10 to 60% by weight of the compound (B), and 20 to 70% by weight of the compound (C) based on the total solid weight of the compound (A), the compound (B) and the compound (C), and the compound (C) containing 10 to 50% by weight of the compound (C-1) based on the total solid weight of the compound (A), the compound (B) and the compound (C).

2. The composition according to claim 1, wherein the urethane compound (A) contains two (meth)acryloyl groups.

3. The composition according to claim 1, wherein the urethane compound (A) contains a polyoxyalkylene chain having a number average molecular weight within the range of 300 to 20,000.

4. The composition according to claim 1, wherein the urethane compound (A) has a weight average molecular weight within the range of 800 to 30,000.

5. The composition according to claim 1, wherein the compound (B) contains two (meth)acryloyl groups.

6. The composition according to claim 1, wherein the compound (B) has a hydroxyl value within the range of 50 to 500 mgKOH/g.

7. The composition according to claim 1, wherein the urethane compound (C-1) has a weight average molecular weight within the range of 600 to 11,000.

8. The composition according to claim 1, wherein at least a portion of the compound (C) is a mono-, di- or poly(meth)acrylate compound.

9. The composition according to claim 1, wherein the photopolymerization initiator (D) is contained within the range of 0.1 to 20 parts by weight based on 100 parts by weight of the total solid content of the compound (A), the compound (B) and the compound (C).

10. The composition according to claim 1, further containing a surfactant and/or a rheology control agent.

11. A method for forming an anti-fogging coating, comprising:

applying the photocurable composition for forming an anti-fogging coating according to claim 1 to a base material surface, followed by irradiating with light.

12. The method according to claim 11, wherein the irradiation with light is carried out in a carbon dioxide atmosphere.

13. The method according to claim 11, wherein the irradiation with light is carried out at a cumulative dose within the range of 10 to 1,000 mJ/cm$^2$.

14. An article on which an anti-fogging coating is formed by the method according to claim 11.

* * * * *